United States Patent
Sreedharan et al.

(10) Patent No.: US 6,473,430 B2
(45) Date of Patent: Oct. 29, 2002

(54) SYSTEMS AND METHODS FOR CONNECTING FRAME RELAY DEVICES VIA AN ATM NETWORK USING A FRAME RELAY PROXY SIGNALING AGENT

(75) Inventors: Sreejith Sreedharan, Richardson; Pradeep Dinkar Samudra, Plano; Gholam Hossein Tolooee, Wylie, all of TX (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/089,613

(22) Filed: Jun. 3, 1998

(65) Prior Publication Data

US 2002/0057700 A1 May 16, 2002

(51) Int. Cl.$^7$ .......................... H04L 12/28; H04L 12/56
(52) U.S. Cl. ................ 370/395.63; 370/395.2; 370/401; 370/410
(58) Field of Search ................ 370/389, 395, 370/396, 397, 398, 399, 400, 401, 409, 410, 352, 395.42, 395.63

(56) References Cited

U.S. PATENT DOCUMENTS

| | | | | |
|---|---|---|---|---|
| 5,490,140 A | * | 2/1996 | Lai et al. | 370/352 |
| 5,490,141 A | * | 2/1996 | Lai et al. | 370/352 |
| 5,956,334 A | * | 9/1999 | Chu et al. | 370/352 |
| 6,094,419 A | * | 7/2000 | Ohyoshi et al. | 370/231 |
| 6,118,759 A | * | 9/2000 | Ohyoshi et al. | 370/229 |
| 6,144,669 A | * | 11/2000 | Williams et al. | 370/401 |

* cited by examiner

Primary Examiner—Douglas Olms
Assistant Examiner—Bob A. Phunkulh
(74) Attorney, Agent, or Firm—John C. Han (57) ABSTRACT

There is disclosed, for use in an ATM network, a system for servicing an SVC connection between a first node and a second node operable to transmit and receive frame relay data frames, wherein the first node is coupled to an ATM access device incapable of providing to the first node support for switched virtual circuit (SVC) connections. The system comprises: 1) a connection controller capable of establishing a fixed connection between the ATM access device and a selected intermediate node in the ATM network; and 2) a frame relay proxy controller disposed at the selected intermediate node and adapted for communicating via the fixed connection established by the connection controller, wherein the frame relay proxy controller receives SVC signaling information from the first node via the fixed connection and establishes an SVC connection with the second node.

20 Claims, 4 Drawing Sheets

SYSTEMS AND METHODS FOR CONNECTING FRAME RELAY DEVICES VIA AN ATM NETWORK USING A FRAME RELAY PROXY SIGNALING AGENT

TECHNICAL FIELD OF THE INVENTION

The present invention is directed, in general, to frame relay and ATM communications and, more specifically, to an ATM switch containing a frame relay proxy signaling agent that allows frame relay end users to communicate across an ATM network.

BACKGROUND OF THE INVENTION

Information systems have evolved from centralized mainframe computer systems supporting a large number of users to distributed computer systems based on local area network (LAN) architectures. As the cost-to-processing-power ratios for desktop PCs and network servers have dropped precipitously, LAN systems have proved to be highly cost effective. As a result, the number of LANs and LAN-based applications has exploded. A consequential development relating to the increased popularity of LANs has been the interconnection of remote LANs, computers, and other equipment into wide area networks (WANs) in order to make more resources available to users. However, a LAN backbone can transmit data between users at high bandwidth rates for only relatively short distances. In order to interconnect devices across large distances, different communication protocols have been developed. These include X.25, ISDN, and frame relay, among others.

Most data transmissions, including file transfers and voice, occur in bursts at random intervals. The bursty nature of most data transmissions means that if the bandwidth allocated to a transmitting device is determined according to its peak demand, much bandwidth is wasted during the "silences" between data bursts. This variable bandwidth demand problem has been solved in part by X.25 and frame relay,: which use statistical multiplexing to improve the throughput of multiple users. Statistical multiplexing takes advantage of the bursty nature of data transmissions to allow a user to transmit bursts of data in excess of the user's allocated bandwidth for relatively short periods of time.

Frame relay has proved to be a popular communication protocol. Frame relay provides up to T3 level speeds (from 56 Kbps up to about 45 Mbps) using packet switching technology. It is optimized for the transfer of protocol-oriented data in packets of variable length. Data is sent in high-level data link control packets, called "frames". A typical frame includes a "header", comprising an address block and a control block, a "payload" or data block that is the actual data to be transferred from endpoint to endpoint, and a CRC error correction block.

An end user transmits data according to a committed information rate (CIR) and a maximum burst size. Bandwidth is allocated dynamically on a packet-by-packet basis within the network. If the end user exceeds the CIR for a short period of time, the transmitted data is buffered within the frame relay network for later transmission. If this condition persists, however, traffic policing and congestion control mechanisms in the network reduce the rate at which the end user transmits data.

Frame relay frames have only a small amount of "overhead" (i.e., header and CRC), only seven (7) bytes compared to hundreds of data bytes). However, the variable lengths of the payload cause variable length delays as the frames move through the network switches. This makes frame relay suitable to pure data transfers, but less suitable to the transfer of mixed voice, data and video. Additionally, the newest LAN/WAN applications, including file transfers, imaging, video conferencing, and the like, demand great amounts of bandwidth that cannot be serviced by frame relay.

ATM is a relatively new technology and currently represents only a comparatively small percentage of the installed network infrastructure. Frame relay still remains as a dominant portion of the installed network infrastructure. Additionally, since many information systems may never need video or other high bandwidth applications, it is unlikely that every LAN or WAN system will need to be converted to an ATM system. Hence, frame relay and ATM will likely coexist for a long period of time.

In order to allow frame relay systems and ATM systems to communicate with one another, a host of well-known interfaces have been developed to interconnect frame relay based networks with ATM based networks. These frame relay-to-ATM interfaces typically include a high-level data link control (HDLC) interface for sending and receiving frames from a frame relay-based network and a segmentation and reassembly (SAR) interface for sending and receiving cells from an ATM-based network. Between the HDLC and the SAR, a memory holds the payloads of the frames and/or cells, and a traffic control processor monitors the traffic for every connection and adjusts the traffic flow based on a leaky bucket software routine. The traffic control processor also provides the frame switching and forwarding functions for every connection.

It is therefore common to find networks containing a mixture of interconnected frame relay devices and ATM devices communicating with one another via an ATM backbone network. To increase the effective throughput of the backbone ATM network, devices called concentrators are frequently used to receive frame relay frames and ATM cells from a group of ATM devices and frame relay devices. A concentrator convert all of the mixed-input traffic to ATM cells on it output and combines and compacts the output traffic before it reaches the high capacity ATM network.

A problem occurs if two frame relay devices attempt to communicate via an ATM network. Many of the nodes in an ATM network, such as concentrators do not contain the signaling support devices needed to establish dynamic connections between two frame relay devices. The concentrators are relatively simple devices that are not easily modified to provide the necessary signaling support to allow communication between two frame relay devices across an ATM network.

There is therefore a need in the art for an improved ATM network that allows a first frame relay device to communicate with a second frame relay device without either frame relay device being directly connected to a device that facilitates dynamic connections of frame relay devices. In particular, there is a need for an improved ATM switch capable of supporting frame switching and signaling.

SUMMARY OF THE INVENTION

To address the above-discussed deficiencies of the prior art, it is a primary object of the present invention to provide,for use in an ATM network capable of transporting data between a first node and a second node operable to transmit and receive frame relay data frames, wherein the first node is coupled to an ATM access device incapable of providing to the first node support for switched virtual circuit (SVC) connections, a system for servicing an SVC connection between the first node and the second node. In one embodiment of the present invention, the system comprises: 1) a connection controller capable of establishing a fixed connection between the ATM access device and a selected intermediate node in the ATM network; and 2) a frame relay proxy controller disposed at the selected intermediate node and adapted for communicating via the fixed connection established by the connection controller, wherein the frame relay proxy controller receives SVC signaling information from the first node via the fixed connection and establishes an SVC connection with the second node.

In one embodiment of the present invention, the intermediate node is an ATM switch.

In another embodiment of the present invention, the fixed connection is a permanent virtual circuit (PVC) connection.

In still another embodiment of the present invention, the connection controller is a network management system.

In a further embodiment of the present invention, the ATM access device is an ATM access concentrator capable of receiving a plurality of input data streams and merging the plurality of input data streams into an ATM cell output stream having a data rate higher than at least one of the plurality of input data streams.

In yet another embodiment of the present, invention, at least one of the input data streams comprises frame relay data frames received from a frame relay device.

In a still further embodiment of the present invention, at least one of the input data streams comprises ATM cells received from an ATM device.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking, the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or, the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for, certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 3B, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged ATM network.

Figure 1:
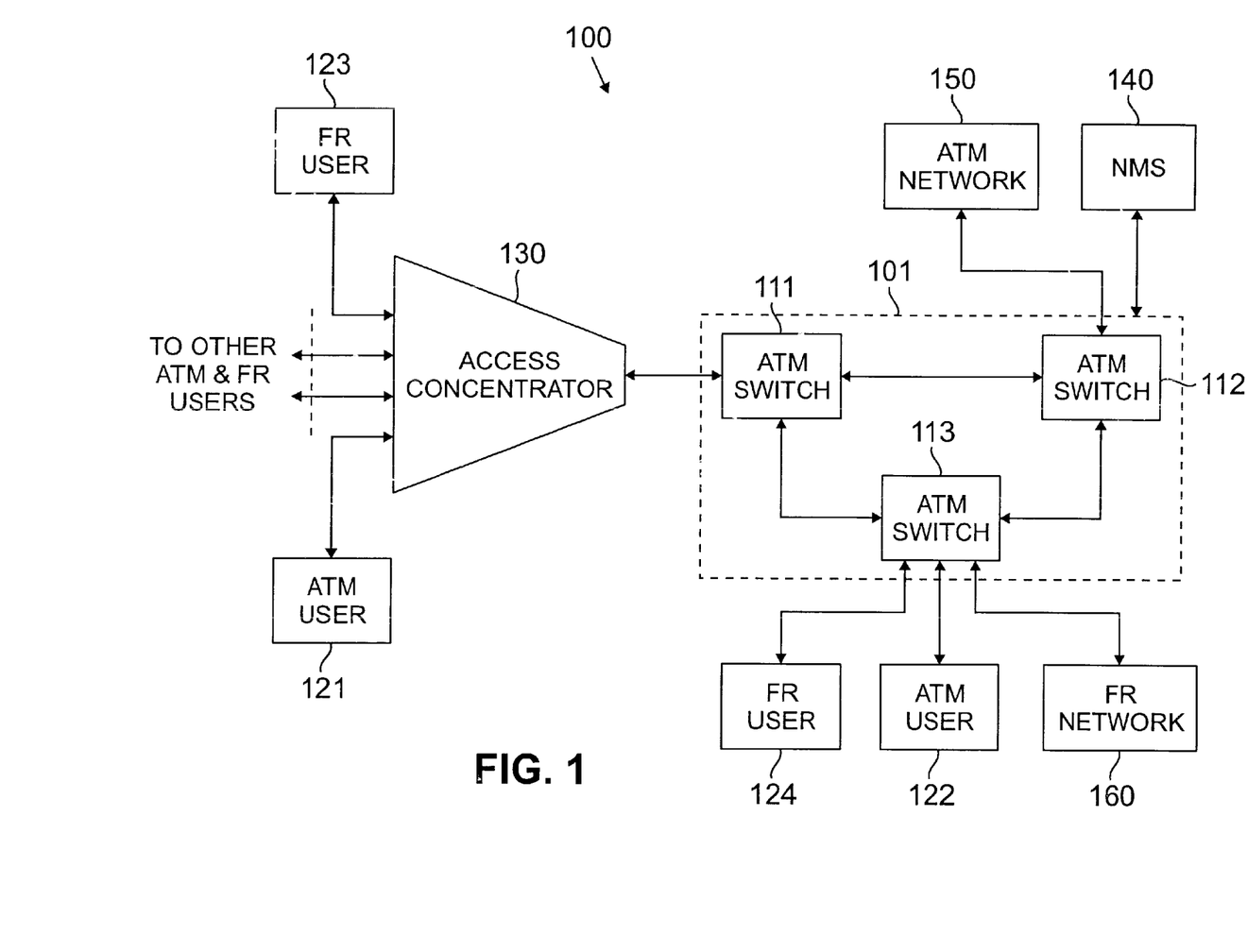
FIG. 1 illustrates an exemplary network infrastructure that interconnects both frame relay end users and ATM end users in accordance with one embodiment of the present invention.

FIG. 1 illustrates an exemplary network infrastructure 100 that interconnects both frame relay end users and ATM end users in accordance with one embodiment of the present invention. The network infrastructure 100 comprises an-ATM backbone network 101 that provides switching connectivity between a plurality of devices, including ATM users 121 and 122, frame relay users 123 and 124, an external ATM network 150, and an external frame relay network 160. ATM users 121 and 122 each may comprise any device capable of sending and/or receiving ATM cells. Likewise, frame relay users 123 and 124 each may comprise any device capable of sending and/or receiving frame relay data frames.

In order to maximize use of the high capacity of ATM backbone network 101, access concentrator 130 is used to receive frame relay frames and ATM cells from a plurality of sources, including frame relay user 123 and ATM user 121. Access concentrator 130 comprises, among other things, frame relay-to-ATM interface circuitry that converts the received frame relay frames to ATM cells. These converted ATM cells and the ATM cells received from ATM devices are then multiplexed together, so that the output of concentrator 130 comprises a comparatively high volume of tightly packed ATM cells. Thus, the concentrator ensures a high volume of ATM traffic is transmitted into ATM backbone network 101.

ATM backbone network 101 comprises a plurality of-ATM switches 111–113 that transport the ATM cells between senders and receivers. A network management system (NMS) 140 performs a variety of functions, including the establishment of permanent virtual circuit (PVC) connections through ATM backbone network 101. A PVC connection is a virtual circuit that provides the equivalent of a dedicated line over a packet switched network between two endpoints. The path between the two endpoints is fixed and uses a fixed logical channel to maintain a permanent association the endpoints. Once the PVC connection is programmed into the network routing logic by NMS 140, all data transmitted between the two endpoints follows a predetermined physical path. After initial setup, a PVC connection requires no further configuration before data is sent. Furthermore, since the PVC connection is perpetual, it also does not require a disconnect operation after data is sent.

In contrasts to a PVC connection, a switched virtual circuit (SVC) connection is a virtual circuit that is established only when data must be transferred across a network. An SVC connection lasts only as long as the data transferred and is broken down as soon as the transfer is complete. The specific path followed by the SVC connection is determined for each data transfer and may vary according to data congestion in the network and the type and condition of the endpoints.

If frame relay user 123 attempts to communicate with frame relay user 124 via an SVC connection, a problem is encountered: frame rely user 123 is not connected directly to a device capable of providing the necessary connection setup and protocol translation to support a switched virtual circuit (SVC) connection. Concentrators such as access concentrator 130 are relatively simple devices incapable of providing the necessary signaling and switching functionality. Providing access concentrator 130 with the necessary frame relay switching and inter-working functions to establish an SVC connection would effectively make access concentrator 130 a mini-switch, which would be cost prohibitive solution.

To overcome this problem, the present invention provides a system and method of establishing an SVC connection using the necessary frame relay switching and signaling functionality resident in one of more of ATM switches 111–113. In one embodiment. of the present invention, at least one of ATM, switches 111–113 comprises a frame relay proxy controller that serves as a remote proxy agent for a frame relay device that is attempting to communicate with another frame relay device via ATM backbone network 101. The present invention provides a dedicated "tunneling" connection from the ATM access device to which a frame relay user is attached (such as access concentrator 130) to the frame relay proxy controller.

The frame relay proxy controller use the tunneling connection to tunnel for data and control messages and "peek" at the SVC connection signaling messages to extract pertinent traffic parameters. In a preferred embodiment of the present invention, NMS 140 establishes a PVC connection that serves as the tunneling connection from the ATM access device to the frame relay proxy agent, in an ATM switch to thereby provide the SVC signaling and switching functionality lacking in the access device.

For example, if frame relay user 123 attempts to exchange data with frame relay user 124, a tunneling PVC connection is initially established by network management system 140 from access concentrator 130 (the ATM access device) through ATM switch 111 to the frame relay proxy controller in ATM switch 113. Each active frame relay port of access concentrator 130 has one corresponding tunneling PVC connection to a proxy interface port on the frame relay proxy controller in ATM switch 113. The tunneling PVC connection provides access concentrator 130 with the frame relay signaling support it lacks. As far as, frame relay user 123 is concerned, it appears to be connected directly to the frame relay proxy controller in ATM switch 113.

As noted above, once the tunneling PVC connection is defined by NMS 140 between access concentrator 130 and the frame relay proxy controller, all future SVC communications between frame relay user 123 and frame relay user 124 are automatically transferred via the tunneling PVC connection. The frame relay proxy controller in ATM switch 113 then is responsible for setting up each individual SVC connection, completing the data transfer via the SVC connection, and then breaking down the SVC connection. In effect, the switching and signaling messages of the SVC connection established by frame relay user 123 are carried at least part way across ATM backbone network 101 by the tunneling PVC connection between access concentrator 130 and ATM switch 113.

In a preferred embodiment of the present invention, NMS 140 may establish more than one tunneling PVC connection to support the SVC connection between frame relay user 123 and frame relay user 124. For example, a second tunneling PVC connection may be established from access concentrator 130 to ATM switch 111, the to ATM switch 112, and then finally to the frame relay proxy controller in ATM switch 13. This second tunneling PVC connection provides resiliency and flexibility in, case of, high traffic conditions in any of the ATM switches in the network.

Figure 2:
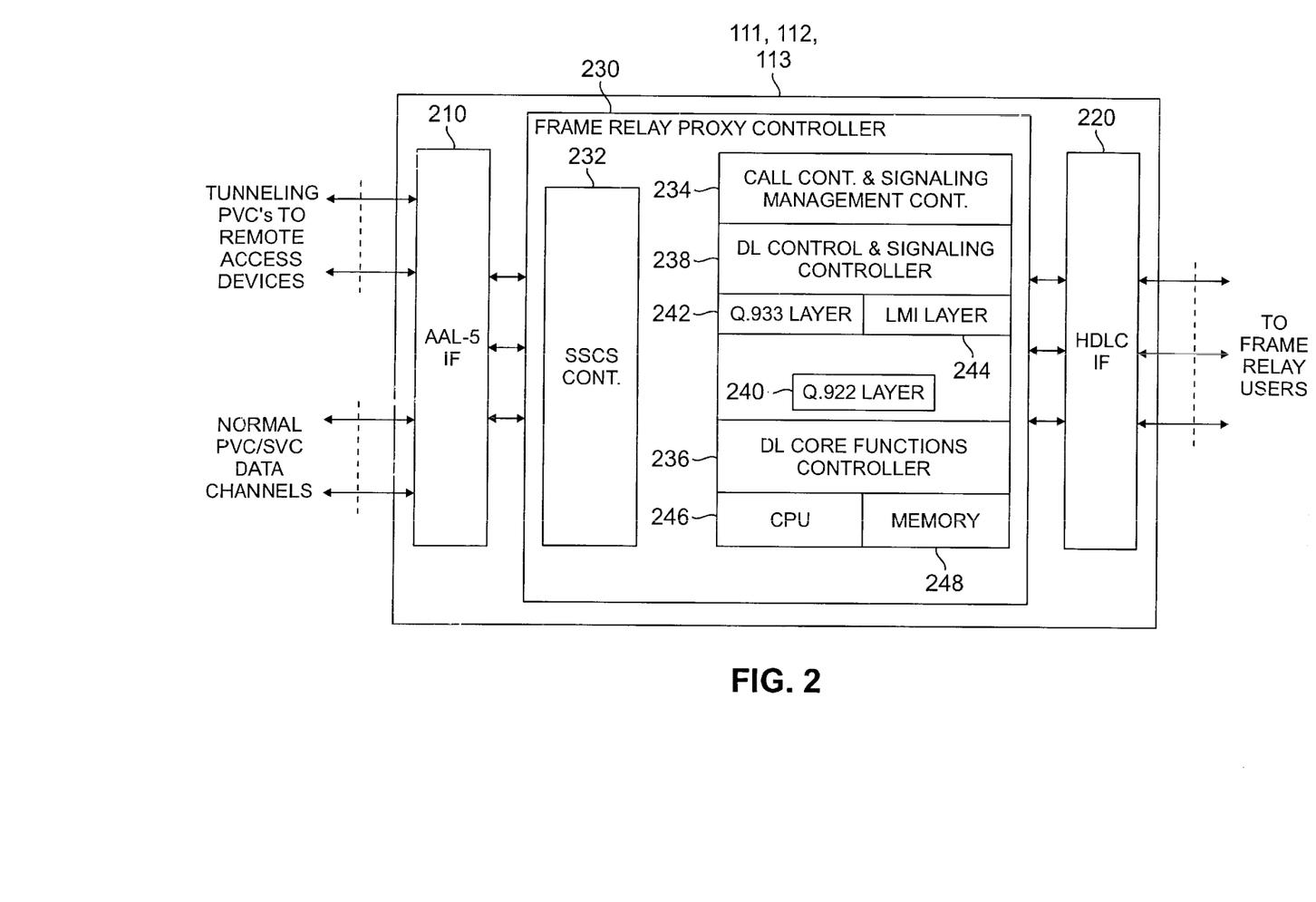
FIG. 2 illustrates in greater detail an ATM switch containing an exemplary frame relay proxy controller in accordance with one embodiment of the present invention.

FIG. 2 illustrates in greater detail an ATM switch 113 (or 111 or 112) containing an exemplary frame relay proxy controller 230 in accordance with one embodiment of the present invention For the sake of brevity and clarity in describing various aspects of the present invention, the remainder of this disclosure may describe specific features of the invention with respect to ATM switch 113 only. It should be understood, however, that the described embodiment of the present invention also may be incorporated in ATM switch 111 or ATM switch 112, or any other ATM switch in ATM backbone network 101. Therefore, the descriptions of the present invention that follow apply to these other ATM switches as well.

ATM switch 113 comprises an ATM-Adaption Layer Type 5 (AAL-5) interface 210, a High-Level Data Link Control (HDLC) interface 220, and a frame relay proxy controller 230. The workings of AAL-5 interface 210 and HDLC interface 220 are generally well known in the art HDLC interface 220 sends frame relay data frames to, for example, frame user 124 and receives frame relay data frames therefrom. The HDLC interface 220 is able to extract the variable length payload from each frame and use the address information in the frame header to forward the payload to its final destination (via frame relay proxy controller 230).

The AAL-5 interface 210 interfaces with the other devices, including access concentrator 130 and ATM switches 111 and 112 in ATM backbone network 101. The connections that ATM switch 113 establishes with other ATM switches may be grouped into two general categories: 1) normal PVC and SVC data channels and 2) tunneling PVC channels to remote ATM access devices (such as access concentrator 130). The AAL-5 interface 210 performs segmentation and re-assembly of the incoming and outgoing traffic on normal PVC connections between ATM switch 113 and other ATM devices. AAL-5 interface 210 also connects proxy tunneling PVCs, which contain both data and control traffic, from remote access devices to frame relay proxy controller 230.

The frame relay proxy controller 230 comprises a service specific convergence sub-layer (SSCS) controller 232, a call control and signaling management controller 234, a data link (DL) core functions controller 236, a data link control and signaling controller 238, a central processor unit (CPU) 246,. and a memory 248. CPU 246 controls the overall operation of the frame relay proxy controller 230 by executing an operating program stored in memory 248. Data link control and signaling controller 238 further comprises a Q.922 layer controller 240, a Q.933 layer controller 242, and a local management interface (LMI) layer controller 244.

SSCS controller 232 is that portion of the convergence sub-layer (CS) that is dependent on the type of traffic that is being converted (in this case frame relay). The convergence sub-layer defines the Layer 3 (OSI model) functions of the upper half of the ATM Adaptation Layer (AAL). The exact functions of the convergence sub-layer are dictated by the particular AAL (1,2, 3/4, or 5) in support of the specific service class (A, B, C, or D). SSCS controller 232 performs the required service-specific convergence functions on the incoming and outgoing data traffic according to selected standards, such as FRF.5 and FRF.8. Among other things, SSCS controller 232 separates data traffic and control traffic. The data traffic is sent to data link core functions controller 236 for transfer to its destination. The control traffic is sent to data link control and signaling controller 238 for further processing.

Call control and signaling management controller 234 is responsible for the initialization, configuration and connectivity to other ATM devices, including ATM switches 111 and 112 in ATM backbone network 101. Call control and signaling management controller 234 configures permanent virtual circuits and switched virtual circuits to the signaling layers (Q.922, Q.933 and LMI). Call control and signaling management controller 234 configures the drivers in the signaling layers to support the subsequent data traffic.

Data link core functions controller 236 receives data frames from SSCS controller 232. The data frames are switched and forwarded by data link core functions controller 236, usually in software. Q.922 layer controller 240, which is equivalent to Layer 2 of the OSI model, handles both PVC connections and SVC connections. The Q.922 standard is an ITU-T international standard that defines the structure of frame relay data frames. All frame relay data frames from either PVC or SVC connections that enter frame relay proxy controller 230 adhere to this standard.

Q.933 layer controller 242, which is equivalent to Layer 3 of the OSI model, provides Layer 3 SVC functionality. The Q.933 standard is an ITU-T international standard that defines frame relay support for SVC connections. It is based on the signaling standard for ISDN. LMI layer controller 244 handles link management for PVC connections. LMI is a frame relay specification that defines the method of exchanging status information between devices, such as routers, switches, and the like.

Finally, network management system (NMS) 140 performs man. machine interactions with ATM switch 113. An operator may configure the external ports of ATM switch 113, the proxy interface ports, the proxy tunneling PVC connections, and the like, via NMS 140. The call control and signaling management controller 234 downloads this configuration information from NMS 140 for further processing.

Figure 3A:
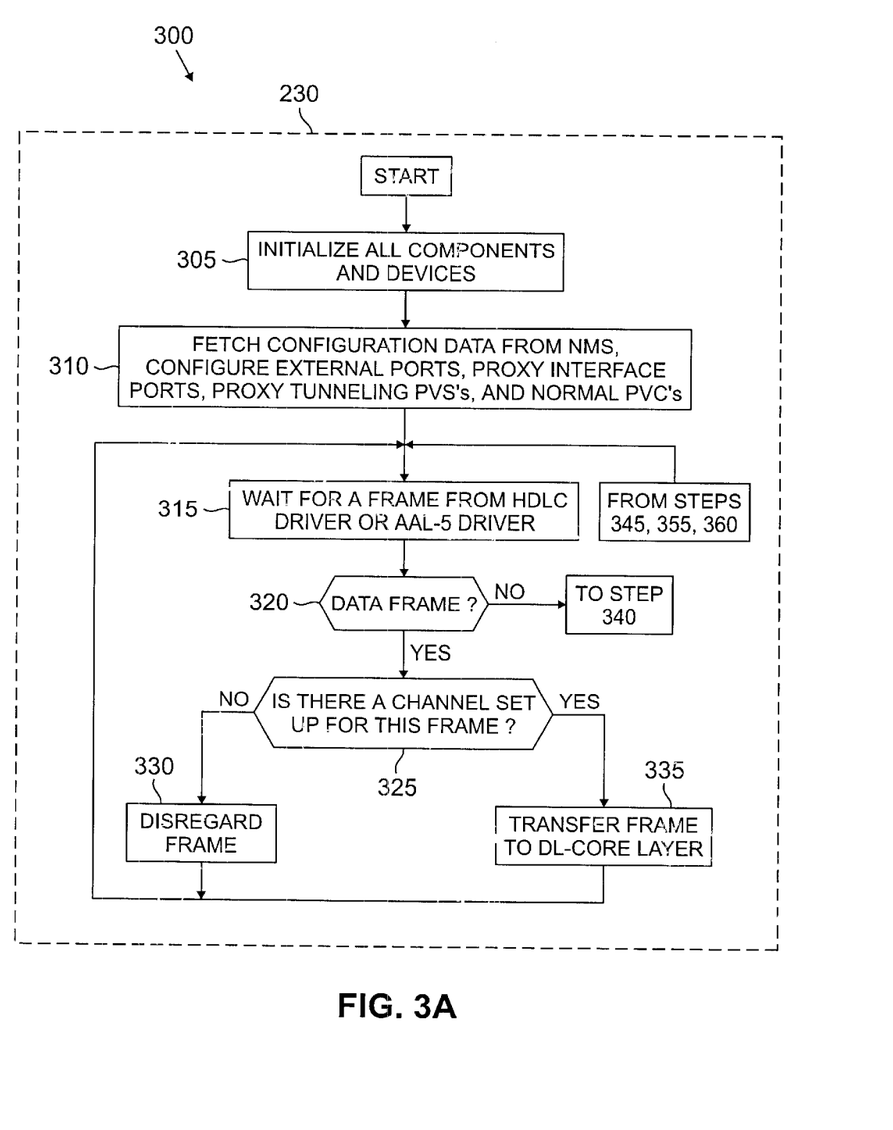
FIGS. 3A and 3B are flow diagrams illustrating the operation of the exemplary frame relay proxy controller in FIG. 2 in accordance with one embodiment of the present invention.
Figure 3B:
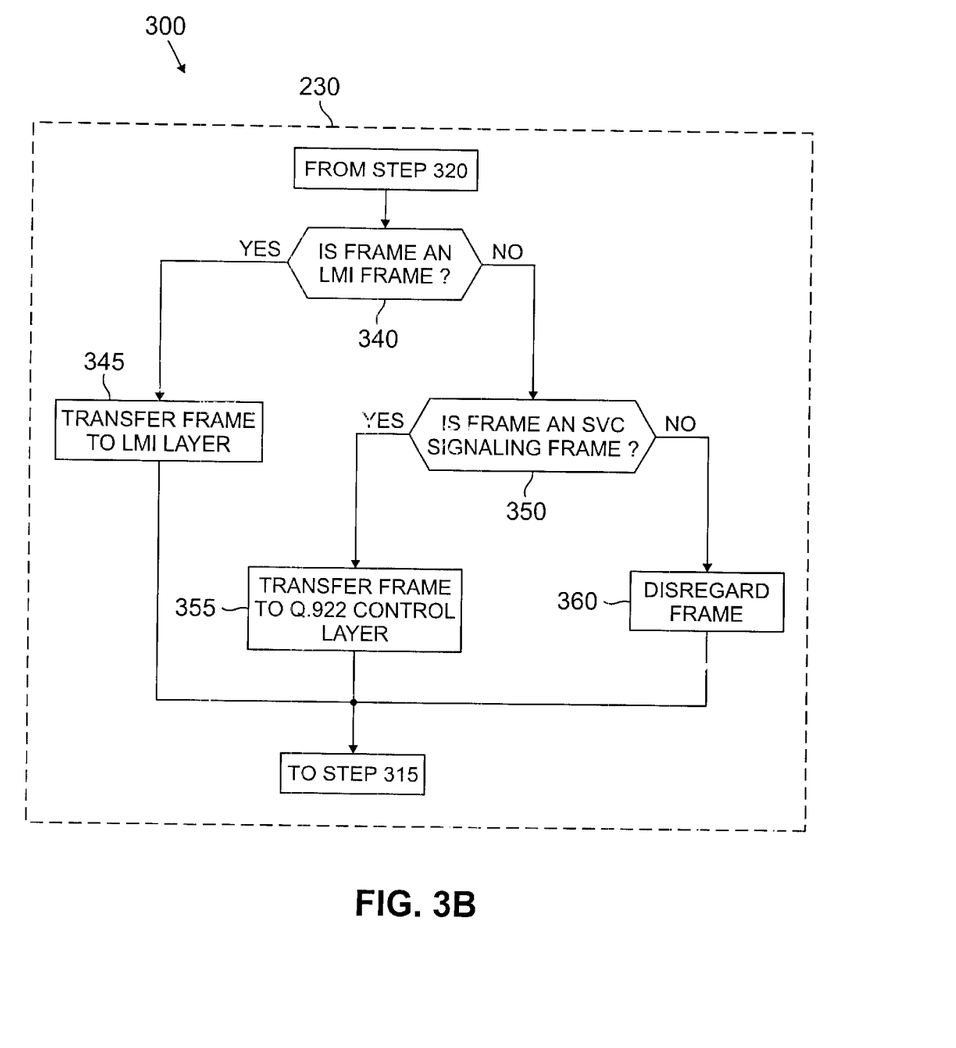

FIGS. 3A and 3B are flow diagrams illustrating the operation of the exemplary frame relay proxy controller 230 in FIG. 2 in accordance with one embodiment of the present invention. After a power up or reset, all components and devices in frame relay proxy controller 230 are initialized (process step 305). Next, call control and signaling management controller 234 fetches configuration data from NMS 140 and configures the external ports, the proxy interface ports, the proxy tunneling PVC connections and the normal PVC connections (process step 310).

When the ports and the PVC connections are configured, SSCS controller 232 in frame relay proxy controller 230 waits for, and eventually receives, frame relay data frames that are part of an SVC connection from either AAL-5 interface 210 or HDLC interface 220 (process step 315). Frame relay proxy controller 230 first determines if the received frame is a normal data frame (process step 320). If the received frame is a normal data frame, frame relay proxy controller 230 determines if a normal PVC or SVC connection has already been established for the received data frame (process step 325). If a normal PVC or SVC connection has not been established, the received data frame is disregarded (process step 330). Frame relay proxy controller 230 then returns to a state of waiting for the next data frame from either AAL-5 interface 210 or HDLC interface 220 (process step 315). If a normal PVC or SVC connection has already been established, the received data frame is sent to data link core functions controller 236 (process step 335). Frame relay proxy controller 230 again returns to a state of waiting for the next data frame from either AAL-5 interface 210 or HDLC interface 220 (process step 315).

If in step 320 above, frame relay proxy controller 230 determined that the received frame was not a normal data frame, but rather a control frame from a tunneling PVC connection, then frame relay proxy controller 230 determines whether the received frame is an LMI frame (process step 340). If the frame is an LMI frame, frame relay proxy controller 230 transfers the data frame to the LMI layer controller 244 (process step 345) and waits for the next data frame to be received (process step 315).

If the frame is not an LMI frame, frame relay proxy controller 230 determines whether the received frame is an SVC signaling frame (process step 350). If the frame is an SVC signaling frame, frame relay proxy controller 230 transfers the frame to the Q.922 layer controller 240 (process step 355) and waits for the next data frame to be received (process step 315). If the frame is not an SVC signaling frame, frame relay proxy controller 230 disregards the frame (process step 360) and waits for the next data frame to be received (process step 315).

Although the present invention has been described in detail, those skilled in the art should understand that they can make various changes, substitutions and alterations herein without departing from the spirit and scope of the invention in its broadest form.

What is claimed is:

1. For use in an ATM network capable of transporting data between a first node and a second node each operable to transmit and receive frame relay data frames, a system for servicing a combination of a fixed connection and a switched virtual circuit (SVC) connection between said first node and said second node comprising:

a connection controller capable of establishing said fixed connection between an ATM access device coupling said first node to said ATM network and a selected intermediate node in said ATM network between said ATM access device and said second node; and a frame relay proxy controller disposed at said selected intermediate node and adapted for communicating with said first node via said fixed connection established by said connection controller, wherein said frame relay proxy controller receives SVC signaling information from said first node via said fixed connection and establishes said SVC connection between said frame relay proxy controller and said second node.

2. The system set forth in claim 1 wherein said intermediate node is an ATM switch and wherein said ATM access device is incapable of providing support for switched virtual circuit connections between said first node and said ATM network.

3. The system set forth in claim 1 wherein said fixed connection is a permanent virtual circuit (PVC) connection.

4. The system set forth in claim 1 wherein said connection controller is a network management system establishing a plurality of fixed connections between said ATM access device and said selected intermediate node for servicing a switched virtual circuit communication between said first and second nodes.

5. The system set forth in claim 1 wherein said ATM access device is an ATM access concentrator capable of receiving a plurality of input data streams and merging said plurality of input data streams into an ATM cell output stream having a data rate higher than at least one of said plurality of input data streams.

6. The system interface set forth in claim 5 wherein at least one of said input data streams comprises frame relay data frames received from a frame relay device.

7. The system interface set forth in claim 5 wherein at least one of said input data streams comprises ATM cells received from an ATM device.

8. An ATM network capable of transporting data between a first node and a second node each capable of transmitting and receiving frame relay data frames via a combination of a fixed connection and a switched virtual circuit connection, the ATM network comprising:

a plurality of ATM switches;

a connection controller capable of establishing said fixed connection between an ATM access device coupling said first node to said plurality of ATM switches and a first selected one of said ATM switches between said ATM access device and said second node; and a frame relay proxy controller disposed at said first selected ATM switch and adapted for communicating with said first node via said fixed connection established by said connection controller, wherein said frame relay proxy controller receives SVC signaling information from said first node via said fixed connection and establishes said SVC connection between said frame relay proxy controller and said second node.

9. The ATM network set forth in claim 8 wherein said connection controller establishes a unique fixed connection between said ATM access device and said ATM switch for each SVC connection requested by a frame relay device coupled to said ATM access device.

10. The ATM network set forth in claim 8 wherein said fixed connection is a permanent virtual circuit (PVC) connection.

11. The ATM network set forth in claim 8 wherein said connection controller is a network management system.

12. The ATM network set forth in claim 8 wherein said ATM access device is an ATM access concentrator capable of receiving a plurality of input data streams and merging said plurality of input data streams into an ATM cell output stream having a data rate higher than at least one of said plurality of input data streams and incapable of providing support for switched virtual circuit connections between said first node and said plurality of ATM switches.

13. The system interface set forth in claim 12 wherein at least one of said input data streams comprises frame relay data frames received from a frame relay device.

14. The system interface set forth in claim 12 wherein at least one of said input data streams comprises ATM cells received from an ATM device.

15. For use in an ATM network capable of transporting data between a first node and a second node each operable to transmit and receive frame relay data frames, a method for servicing a combination of a fixed connection and a switched virtual circuit (SVC) connection between the first node and the second node, the method comprising the steps of:

establishing said fixed connection between the first node, an ATM access device coupling the first node to the ATM network, and a selected intermediate node in the ATM network between the ATM access device and the second node; and receiving SVC signaling information from the first node via the fixed connection at a frame relay proxy controller disposed at the selected intermediate node; and establishing said SVC connection between the frame relay proxy controller and the second node.

16. The method set forth in claim 15 wherein the intermediate node is an ATM switch and wherein the ATM access device is incapable of providing support for switched virtual circuit connections between said first node and said ATM network.

17. The method set forth in claim 15 wherein the fixed connection is a permanent virtual circuit (PVC) connection.

18. The method set forth in claim 15 wherein the fixed connection is one of a plurality of fixed connections between the ATM access device and the selected intermediate node established by a network management system for servicing a switched virtual circuit communication between the first and second nodes.

19. The method set forth in claim 15 wherein the ATM access device is an ATM access concentrator capable of receiving a plurality of input data streams and merging the plurality of input data streams into an ATM cell output stream having a data rate higher than at least one of the plurality of input data streams.

20. The method set forth in claim 19 wherein at least one of the input data streams comprises frame relay data frames received from a frame relay device.

* * * * *

UNITED STATES PATENT AND TRADEMARK OFFICE
CERTIFICATE OF CORRECTION

PATENT NO. : 6,473,430 B1
DATED : October 29, 2002
INVENTOR(S) : Sreejith Sreedharan et al.

It is certified that error appears in the above-identified patent and that said Letters Patent is hereby corrected as shown below:

Column 5,
Line 1, change "contrasts" to -- contrast --.

Column 6,
Line 12, change "13" to -- 113 --.
Line 33, after "art" insert -- . --.
Line 59, after "246," delete ".".

Signed and Sealed this

Twelfth Day of August, 2003

JAMES E. ROGAN
*Director of the United States Patent and Trademark Office*